United States Patent [19]

Ichimiya et al.

[11] Patent Number: 4,573,120
[45] Date of Patent: Feb. 25, 1986

[54] I/O CONTROL SYSTEM FOR DATA TRANSMISSION AND RECEPTION BETWEEN CENTRAL PROCESSOR AND I/O UNITS

[75] Inventors: Yoshichika Ichimiya, Tokorozawa; Tsuneta Sudo, Kodaira; Tŭro Takehisa, Gyoda; Katsumi Shimada, Saitama, all of Japan

[73] Assignee: Takeda Riken Co., Ltd., Tokyo, Japan

[21] Appl. No.: 547,461

[22] Filed: Nov. 1, 1983

Related U.S. Application Data

[63] Continuation of Ser. No. 195,078, Oct. 8, 1980, abandoned.

[30] Foreign Application Priority Data

Oct. 19, 1979 [JP] Japan ................................ 54-135531

[51] Int. Cl.⁴ .................... G06F 13/14; G06F 13/38
[52] U.S. Cl. .................................................. 364/200
[58] Field of Search ................................ 364/200, 900

[56] References Cited

U.S. PATENT DOCUMENTS

| | | | |
|---|---|---|---|
| 3,752,932 | 8/1973 | Frisone | 364/900 |
| 3,886,524 | 5/1975 | Appelt | 364/200 |
| 4,016,369 | 4/1977 | Pedersen | 364/900 |
| 4,019,176 | 4/1977 | Cour et al. | 364/900 |
| 4,034,351 | 7/1977 | Takezoe | 364/900 |
| 4,176,401 | 11/1979 | Lonberger | 364/900 |
| 4,195,351 | 3/1980 | Barner et al. | 179/18 EA |
| 4,224,684 | 9/1980 | Conner et al. | 364/900 |
| 4,227,178 | 10/1980 | Gergaud et al. | 364/900 |
| 4,275,455 | 6/1981 | Bartlett | 364/900 |
| 4,380,052 | 4/1983 | Shima | 364/900 |

Primary Examiner—Gareth D. Shaw
Assistant Examiner—Daniel K. Dorsey
Attorney, Agent, or Firm—Staas & Halsey

[57] ABSTRACT

A central processing unit is cascade-connected with a plurality of I/O units, and a bus interconnecting them comprises a plurality of data lines for transmitting a control command signal, an address signal and a data signal on a time shared basis, a plurality of tag lines, each transmitting a tag signal indicating which one of the signals is provided on the data lines, and a clock line for transmitting a clock signal for these signals.

15 Claims, 9 Drawing Figures

I/O CONTROL SYSTEM FOR DATA TRANSMISSION AND RECEPTION BETWEEN CENTRAL PROCESSOR AND I/O UNITS

This application is a continuation of application Ser. No. 195,078, filed Oct. 8, 1980 now abandoned.

BACKGROUND OF THE INVENTION

The present invention relates to an input/output control system for data transmission and reception between a central processing unit and a plurality of input/output units via a common bus under the control of the central processing unit.

In this kind of input/output (hereinafter referred to as I/O) control system heretofore employed, a central processing unit (hereinafter referred to as CPU) is connected to buses, to which I/O units are connected via individual I/O interfaces. As the buses use is made of a data bus for transmitting data, an address bus for transmitting an address signal for selecting a desired one of the I/O units and a control bus for transmitting control signals such as a read/write control signal, an interrupt request acknowledgment signal, an interruption inhibit signal, a reset signal, a trigger signal and an interrupt request signal. In addition, since each bus transmits the signal in the form of parallel signals, the number of core conductors used for each bus is appreciably large, resulting in a bus cable becoming thick. Furthermore, in order to increase the number of bits of one data signal or to increase the number of bits of one address signal with the view of increasing the number of selectable I/O units, the number of core conductors of the data bus or address bus must be increased and, in this case, it is usually necessary to replace the bus with a new one. In practice, however, such replacement of the bus is very difficult. Moreover, in the prior art system, since data is transmitted over a common data bus in both directions, there is the possibility that if mismatching exists in the joint between the data bus and each I/O unit, a reflected wave is generated to cause erroneous data transmission reception. Such an error increases with an increase in the number of I/O interfaces connected to the data bus, and the influence of this error becomes marked in the case of transmitting and receiving signals at high speed. Besides, since signals such as the data signal and so forth are transmitted over the common data bus in two directions as mentioned above, it is necessary to provide two-way drivers for the bus; this leads to an increase in the cost of the entire system. Also, such a driver must be provided for each core conductor of each bus, and consequently, the number of such drivers used is very large. Further, since the signal sending-out rate of the CPU is determined on the basis of the time necessary for a signal from the CPU to reach an I/O unit located at a place remotest from the CPU, the signal sending-out rate must be reduced as the transmission distance increases. This imposes a limitation on the data transmission rate, making it impossible to achieve high-speed data transmission.

It is an object of the present invention to provide an I/O control system which requires less core conductors in the bus connecting the system.

Another object of the present invention is to provide an I/O control system in which the number of bits of a data signal, i.e. the number of bits of one word, or the number of bits of an address signal, can be increased, and consequently the number of I/O units can be increased without increasing the number of core conductors forming the bus.

Another object of the present invention is to provide an I/O control system which permits data transmission free from the influence of a reflected wave occurring on the bus, that is, without disturbing the waveform of a transmitted signal by the reflected wave, thus enabling an increase in the transmission distance.

Another object of the present invention is to provide an I/O control system which permits high-speed data transfer regardless of the distance between a CPU and an I/O unit which is the remotest therefrom.

Yet another object of the present invention is to provide an I/O control system which requires less core conductors forming each of signal buses and consequently requires less drivers for driving the signal bus and, in addition, employs only one-way drivers as such drivers, and hence is simple-structured and inexpensive.

SUMMARY OF THE INVENTION

According to the present invention, I/O interfaces are sequentially cascade-connected via a bus with a CPU. The bus comprises a plurality of data lines for transmitting an address signal, a data signal and a control command signal on a time shared basis, a plurality of tag lines for transmitting a tag signal indicating which kind of signal is transmitted over the data lines, and a clock line for transmitting a clock signal for the signals on the data lines and the tag lines. Over the data lines are transmitted the control command signal, the address signal and the data signal in synchronism with the clock signal on the time shared basis. In addition, the tag signal indicating which signal is being provided on the data lines is delivered on one of the tag lines. Each I/O interface is provided with relay means for receiving a signal inputted via an input port from each line by a receiver and sending out the received signal by a driver onto a corresponding line. Accordingly, each signal from the CPU is supplied to all the I/O units one after another. In each I/O unit, a required control command signal is inputted into a control register by the tag signal from the tag lines and the clock signal from the clock line, and the content of the control command signal is decoded, performing control corresponding to the decoded content. That is, a control operation for inputting data from the data lines or outputting data to the data lines, or an operation for confirming an interrupt request or inhibiting an interrupt or the like is carried out. Further, in each I/O unit an address on the data lines is inputted by the tag signal and the clock signal into an address register and the address is decided as to whether or not it is the address of the I/O unit; if so, the control corresponding to the control command at that time is performed in the I/O interface of the I/O unit. Moreover, in accordance with the control command, the tag signal on the tag lines and the clock signal, an operation is conducted for inputting the data from the data lines or outputting a data signal thereto.

In the I/O control system of the present invention, since the control command, the address signal and the data signal are transmitted over the same data lines on a time shared basis, as described above, the number of core conductors forming the bus is small. Thus, even if the number of bits of the address signal or the number of bits of one word of the data signal is increased, the number of core conductors of the bus need not be increased; namely, the function of the I/O control system can be enhanced without increasing the number of core conductors of the bus. Further, the I/O interfaces are sequentially cascade-connected via a bus and a signal is transmitted over the bus in one direction, so that even if a reflected wave is generated due to mismatching in the joint between the bus and each I/O unit, the influence of the reflected wave can be lessened. Moreover, each I/O interface is required only to relay and output a signal inputted thereto from the bus and, if the bus is short, no drivers are needed. Besies, since the signal transmission is not a both-way one, the number of drivers for each core conductor is one-half that in the prior art and a combined total of core conductors used is small. Accordingly, the number of drivers is markedly small as compared with that employed in the prior art; hence, the cost of the I/O control system can be reduced. In addition, since signals provided on the bus are each relayed by the I/O interfaces one after another, it is possible to transmit the signals, shaping their waveforms as required, and the transmission line can be lengthened. Moreover, since signals are transmitted in a serial manner, data signals can be sent out in succession, and consequently the data signal transmission rate can be increased.

DETAILED DESCRIPTION OF THE PREFERRED EMBODIMENTS

Figure 1:
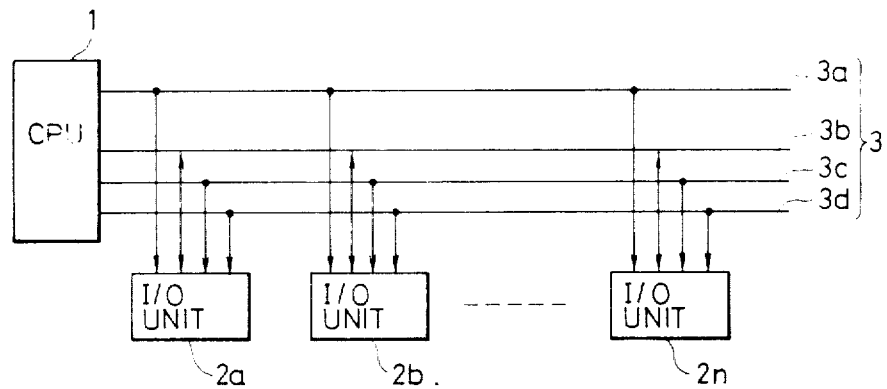
FIG. 1 is a system diagram showing a conventional I/O control system.
Figure 2:
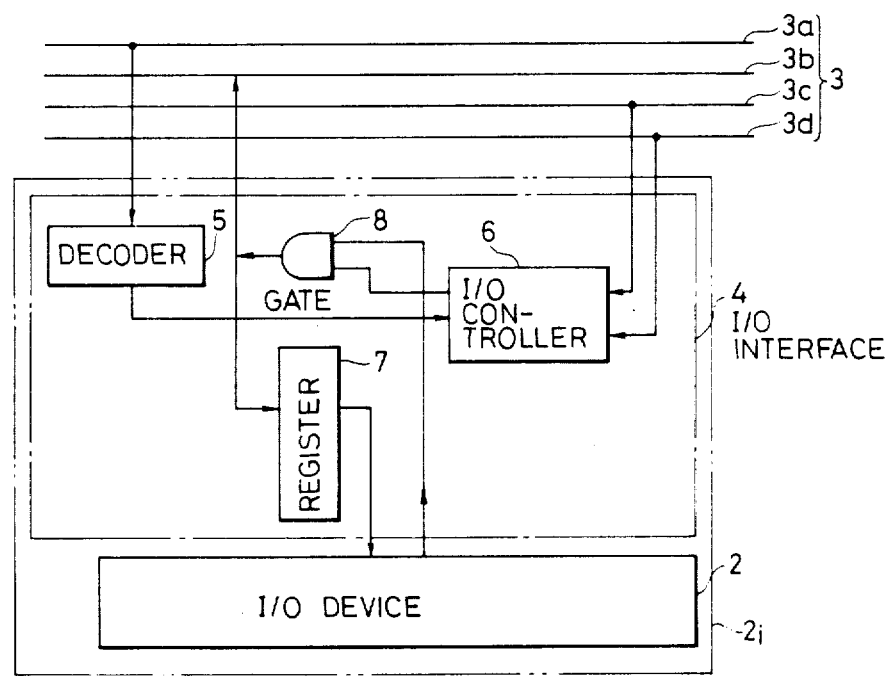
FIG. 2 is a diagram showing the arrangement of an I/O interface for use in the conventional I/O control system.

To facilitate a better understanding of the I/O control system of the present invention, a description will be given of a conventional I/O control system. FIG. 1 shows a prior art I/O control system in which a CPU 1 and I/O units 2a to 2n are connected in parallel with a bus 3. The bus 3 comprises an address bus 3a, a data bus 3b, a strobe bus 3c and a control command bus 3d. To these buses 3a to 3d are connected the I/O units 2a to 2n in parallel. The units 2a to 2n are each provided with an I/O interface for data transmission and reception between the I/O unit and the bus. The I/O interface has an arrangement such, for example, as shown in FIG. 2. In the unit 2i, an I/O device 2 is connected via the I/O interface 4 to the bus 3. The I/O interface 4 is provided with a decoder 5 which is connected to the address bus 3a. The decoder 5 interprets an address signal on the address bus 3a as to whether it indicates the address of the I/O unit 2i. According to the result of interpretation, an I/O controller 6 is controlled. In this case, if an input command signal is provided on the control command bus 3d, data on the data bus 3b is loaded in a receiving register 7 and then provided to the I/O device 2 at a certain timing. When the signal on the control command bus 3d is an output command signal, a gate 8 is opened by the output of the I/O controller 6 to pass on data from the I/O device 2 to the data bus 3b. The data thus sent out are provided to the CPU 1.

In the conventional arrangement, the address bus 3a, the strobe bus 3c and the control command bus 3d are each formed by a one-way bus from the CPU 1 to each of the I/O units 2a, 2b, ... 2n, and the data bus 3b is a two-way one. The data signal is sent in the form of parallel bits for each word and the address signal is also sent in the parallel-bit form, so that the data bus 3b and the address bus 3a are each composed of core conductors of the same number as the bits used. Further, since the control command signal includes data write, data readout, interrupt request acknowledgment, interruption inhibit, resetting, triggering and interrupt request signals, the control command bus 3d is also composed of a plurality of core conductors.

Such a prior art I/O control system has the following defects. With an increase in the number of bits of each of the address signal and the data signal as a result of improvement in the control function, the address bus 3a and the data bus 3b each must be formed by core conductors equal in number to the bits needed; namely, the cable including both buses must be thick. Further, in order to improve the function of the existing system, it is necessary that the cable comprising buses be replaced with a new one and such a modification is generally very impractical, if not efffectively impossible. Moreover, in the part where each of the I/O units 2a, 2b, ... . 2n is connected to the bus, there occurs a reflected wave due to mismatching, for example, in a connector part. The reflected wave occurs in the connecting part of each unit and is superimposed on the waveform sent out from the unit; accordingly, the influence of this reflected wave may increase in proportion to the number of I/O units employed and the larger the number of units is, the more the waveform sent out is disturbed. In addition to this, the distance of transmission is also restricted by the influence of a delay of a signal propagating in the bus. Besides, since the line speed is determined depending on the time in which a signal from the CPU 1 reaches the I/O unit which is the remotest therefrom, the line speed must be reduced when the distance of transmission is long. This imposes a limitation on the data transfer speed, making it impossible to transfer data at high speed.

Figure 3:
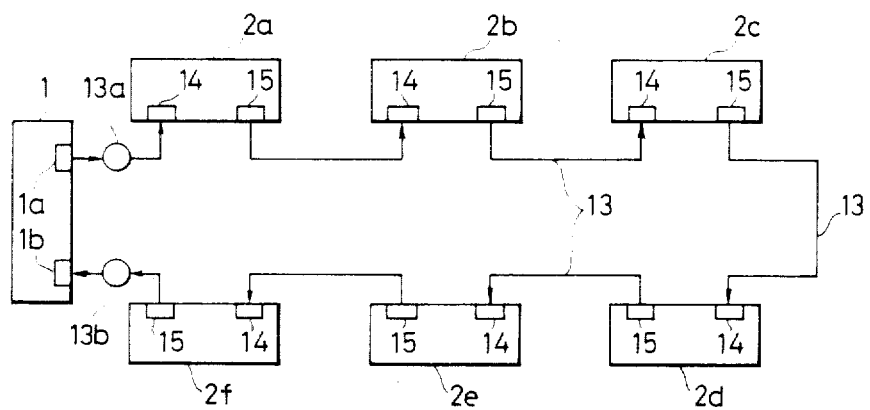
FIG. 3 is a system diagram illustrating an embodiment of the I/O control system of the present invention.

FIG. 3 illustrates the entire arrangement of an embodiment of the I/O control system of the present invention. In FIG. 3, parts corresponding to those in FIG. 1 are identified by the same reference numerals and no detailed description will be given. In the present invention, the plurality of I/O units 2a to 2f are cascade-connected via a bus 13 and the CPU 1 is connected to the cascade connection.

The I/O units 2a to 2f are each provided with an input port 14 and an output port 15, and the output port 15 of each I/O unit is connected via the bus 13 to the input port 14 of the next-stage I/O unit. Consequently, the I/O units 2a to 2f are cascade-connected via the bus 13 and the cascade connection constitutes a one-way bus. An input terminal 13a and an output terminal 13b of the one-way bus are respectively connected to an output port 1a and an input port 1b of the CPU 1.

Figure 4:
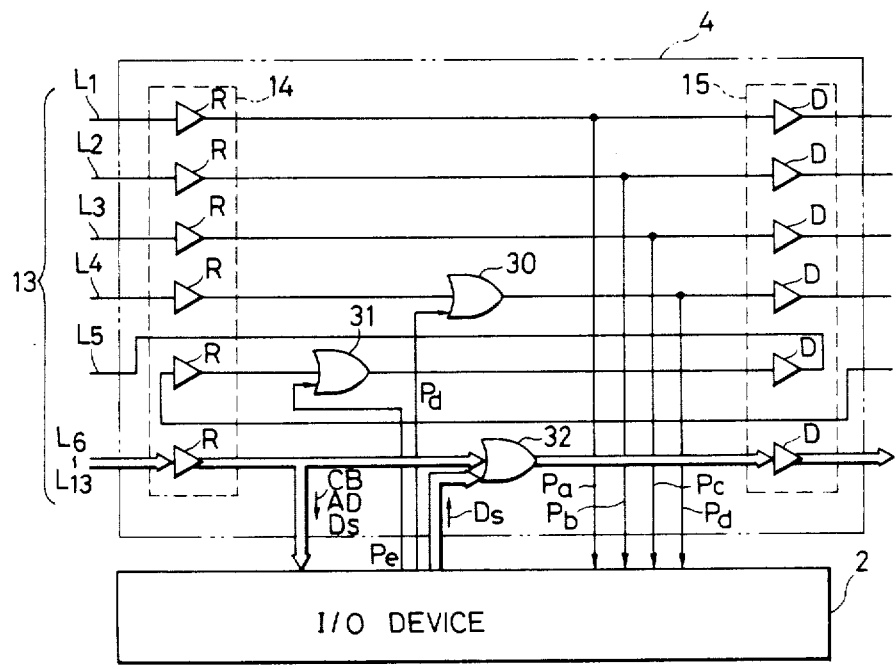
FIG. 4 is a diagram illustrating the arrangement of an example of an I/O interface for use in the I/O control system of the present invention.

FIG. 4 shows the internal arrangement of the I/O interface 4 of each of the I/O units 2a to 2f. The I/O interface 4 has an input port 14 and an output port 15, which are connected to the bus 13. In this example, the bus 13 is composed of a clock line $L_1$, tag lines $L_2$ to $L_4$, a response signal line $L_5$ and eight data lines $L_6$ to $L_{13}$.

The clock line $L_1$ transmits such a clock pulse signal Pa as shown in FIG. 5A; the tag line $L_2$ transmits such a command indicating signal Pb as shown in FIG. 5B; the tag line $L_3$ transmits such an address indicating signal Pc as shown in FIG. 5C; the tag line $L_4$ transmits such a data indicating signal Pd as shown in FIG. 5D; and the response signal line $L_5$ transmits a response signal Pe, such as shown in FIG. 5E, from a designated one of the I/O units to the CPU 1.

The eight data lines $L_6$ to $L_{13}$ sequentially transmit a control command signal CB, an address signal $A_D$ and a data signal $D_S$ on a time shared basis, as shown in FIG. 5F. The signals Pb, Pc and Pd indicating which ones of the signals CB, $A_D$ and $D_S$ are provided on the data lines $L_6$ to $L_{13}$ are respectively sent out on the tag lines $L_2$, $L_3$, and $L_4$. Output terminals of receivers R of the input port 14 are each connected to an input terminal of one of drivers D of the output port 15. From the lines $L_1$ to $L_4$, the clock signal Pa, the command indicating signal Pb, the address indicating signal Pc and the data indicating signal Pd are respectively applied to the I/O device 2. From the data lines $L_6$ to $L_{13}$, the control command signal CB, the address signal $A_D$ and the data signal $D_S$ are applied to the I/O device 2. The response signal line $L_5$ is reverse in the direction of transmission from the other lines. Between the receivers R and the drivers D connected to the tag line $L_4$, the response signal line $L_5$ and the data line $L_6$ to $L_{13}$, there are respectively connected, for example, OR gates 30, 31 and 32, by which the data indicating signal Pd, the response signal Pe and the data signal $D_S$ from the I/O device 2 are respectively outputted on the tag line $L_5$, the response signal line $L_5$ and the data lines $L_6$ to $L_{13}$.

Figure 5:
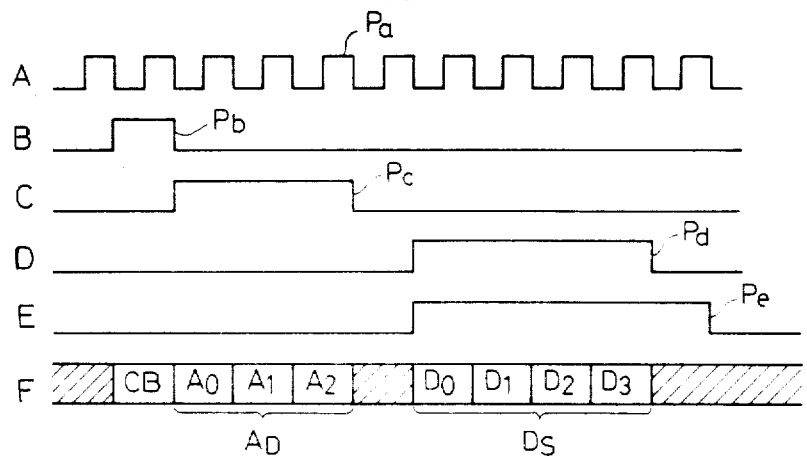
FIG. 5 is a timing chart showing examples of various signal states on buses in the I/O control system of the present invention.
Figure 6:
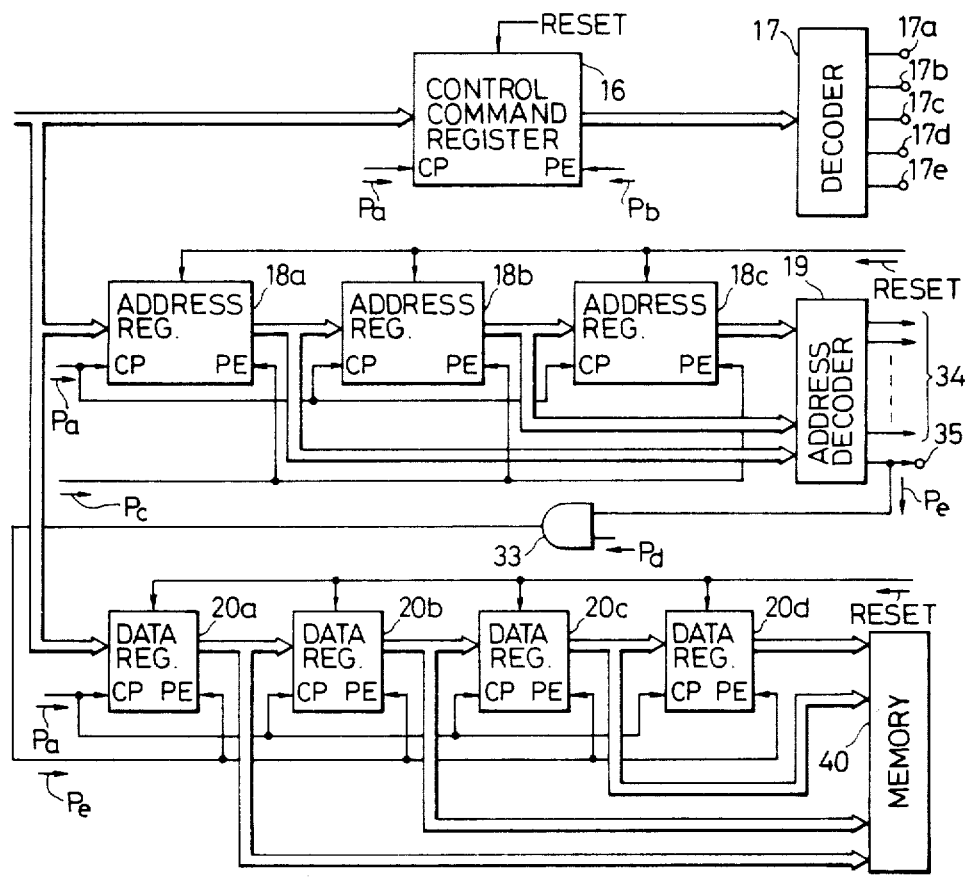
FIG. 6 is a diagram illustrating a specific example of a data write section of an I/O unit.

FIG. 6 shows one part of the I/O device 2. A control command register 16 is provided for loading the control command signal CB. The control command register 16 is formed by an 8-bit register, in which is read at one time the control command signal CB having, as one byte, parallel eight bits provided on the data lines $L_6$ to $L_{13}$. The control command signal CB read in the register 16 is supplied to a control command decoder 17 for decoding and, in accordance with the decoded content of the control command signal CB, a decoded signal is provided to any one of output terminals 17a, 17b, 17c, 17d and 17e. By the decoded signal, each part of the I/O device 2 is controlled as predetermined. To a control terminal PE of the control command register 16 is applied the command indicating signal Pb. When the command indicating signal Pb assumes H logic, the register 16 reads therein the signals on the data lines $L_6$ to $L_{13}$ in synchronism with the clock signal Pa supplied to a terminal CP of the register 16. When the command indicating signal Pb has the H logic, the control command signal CB is on the data lines $L_6$ to $L_{13}$, as depicted in FIG. 5F. Accordingly, the control command signal CB is read in the register 16.

Address registers 18a, 18b and 18c are provided for loading an address signal. To a control terminal PE of each of the address registers 18a to 18c is supplied the address indicating signal Pc shown in FIG. 5C. When the address signal is provided on the data lines $L_6$ to $L_{13}$, the address indicating signal Pc assumes H logic in synchronism with it, so that the address registers 18a to 18c are each driven by the clock signal Pa applied to their terminals CP; in this case, the address register 18a reads therein the signal on the data lines $L_6$ to $L_{13}$, the address register 18b reads therein from the address register 18a a signal stored therein and the address register 18c reads therein from the address register 18b a signal stored therein. In this example, the address signal $A_D$ is composed of three bytes of signals $A_0$, $A_1$ and $A_2$, each having eight bits in parallel and an address signal having a total of $8 \times 3$ bits is sent out byte by byte in synchronism with the clock signal Pa. The address registers 18a to 18c are sequentially cascade-connected; namely, the address signal $A_0$ of the first byte read in the first-stage register 18a is transferred to the second-stage register 18b by the next clock signal and the address signal $A_1$ of the second byte is read in the first-stage register 18a. In this way, the address signals $A_2$, $A_1$ and $A_0$ of three bytes are read in the registers 18a to 18c by three clock signals Pa.

The outputs from the address registers 18a to 18c are each provided as a parallel signal of $8 \times 3$ bits to an address decoder 19. By the address decoder 19, it is interpreted whether the I/O device 2 is designated or not and, according to the result of interpretation, the response signal Pe is sent back to the CPU 1 and, at the same time, it is provided, for example, via an AND circuit 33 to a control terminal PE of each of data registers 20a to 20d so that the data signal $D_S$ following the address signal $A_D$ may be read therein. To the other input side of the AND circuit 33 is applied the data indicating signal Pd from the tag line $L_4$. In this example, the data signal is shown to be a 4-byte signal which is composed of signals $D_0$, $D_1$, $D_2$ and $D_3$, each having in parallel eight bits. Accordingly, the data registers 20a to 20d are each formed by an 8-bit register and is cascade-connected, the first-stage register 20a being connected to the data lines $L_6$ to $L_{13}$. By four clock signals, the data signals $D_0$ to $D_3$ are respectively read in the data registers 20d, 20c, 20b and 20a. The outputs from the registers 20a to 20d are each taken out as a parallel signal of $8 \times 4$ bits and stored, for example, in a memory 40 of the I/O unit 2. The data stored in the memory 40 are read out to be used by, for example, such as a printer, magnetic disk, magnetic tape, CRT display and so forth although they are not shown in the figure.

In the manner described above, the signal from the CPU 1 is relayed by the I/O units and loaded in a desired one of them. The data read out from a selected one of the I/O units is relayed by the subsequent units and loaded in the input port 1b of the CPU 1.

In FIG. 6, a terminal 17a of the control command decoder 17 is an output terminal for a command for reading out data from the I/O unit; a terminal 17b is an output terminal for a command for writing data in the I/O unit; a terminal 17c is an output terminal for a write request acknowledgment command; a terminal 17d is an output terminal for an interrupt inhibit command; and a terminal 17e is an output terminal for a reset command. Accordingly, when the reset command is applied from the CPU 1 to the data lines $L_6$ to $L_{13}$ and the tag line $L_2$ is given H logic, a reset signal is provided from the output terminal 17e of the control command decoder 17 of each I/O device 2, resetting the control command register 16, the address registers 18a to 18c and the data registers 20a to 20d. This resetting may be effected by a command transmitted over the data line but may also be achieved through a reset line specially provided. In the address decoder 19, only high-order bits of the address signal indicate which one of the I/O units is assigned, and when the address indicated by the high-order bits is the address of the I/O unit to which the address decoder 19 belongs, the signal Pe is derived at a terminal 35, as described previously. This signal Pe is supplied to the AND circuit 33. On the other hand, the address decoder 19 provides a signal at any one of a plurality of terminals 34 in accordance with low-order bits of the address signal applied to the decoder 19, by which signal various kinds of registers and so forth in the I/O unit are selected though not shown.

Figure 7:
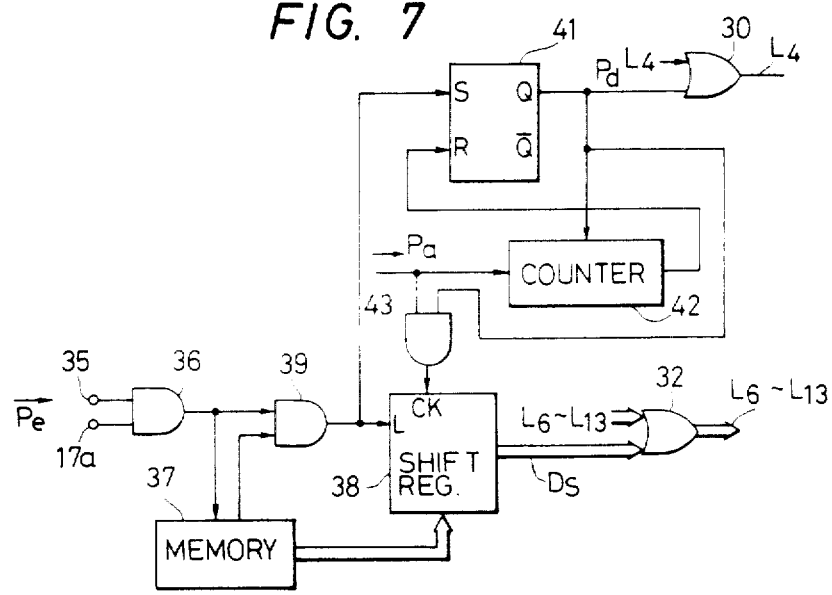
FIG. 7 is a diagram illustrating a specific example of a data read-out section of the I/O unit.

For reading out data from the I/O unit, use is made of such an arrangement as shown in FIG. 7. The data to be read out are provided beforehand to a memory 37 from such a read-out device as, for example, a magnetic disk, keyboard, card reader and so forth though they are not shown in the figure. As is the case with the foregoing, an address for selecting a desired one of the I/O units is set in the address registers $18a$ to $18c$ in FIG. 6 and a command indicating read-out of data from the I/O unit is set in the control command register 16. Accordingly, a signal having selected the I/O unit is obtained at the terminal 35 of the address decoder 19 and a signal indicating a read command is derived from the terminal $17a$ of the control command decoder 17. These signals are provided to an AND circuit 36 in FIG. 7. By a coincidence output from the AND circuit 36, the memory 37 which has set therein data to be read out from the I/O unit is read out. The data thus read out, which is 32-bit data in this example, is loaded eight bits at a time into a parallel 8-bit shift register 38 in a predetermined sequential order. In this case, when coincidence is detected by an AND circuit 39 between a read end signal from the memory 37 and the output from the AND circuit 36 and then the coincidence output is provided to a load terminal of the parallel shift register 38, the data to be read out is loaded in the parallel shift register 38. The parallel shift register 38 outputs parallel 8-bit data. In this example, the parallel shift register 38 has four serial stages and is read out by the clock signal Pa; namely, the data is read out eight bits at a time upon each occurrence of the pulse signal Pa and provided as the data $D_S$ consisting of four successive parallel, 8-bit bytes to an OR circuit 32 in FIG. 4, from which each bit of the parallel eight bits is applied to a corresponding one of the data lines $L_6$ to $L_{13}$.

By the output from the AND circuit 39 a flip-flop 41 is set, the output from which is supplied as the data indicating signal Pd to the tag line $L_4$ via an OR circuit 30. By the signal Pd a gate 43 is opened, through which the clock signal Pa is provided to the parallel shift register 38 to drive it. The signal Pd is also applied to a counter 42 to render it operable to count the clock signal Pa. When the counter 42 has counted four clocks of signal Pa, it provides an output to the flip-flop 41 to reset it, and consequently the signal Pd on the tag line $L_4$ becomes low-level. As a result of this, the gate 43 is closed to end the read-out of the parallel shift register 38. In this way, while the data is read out from the I/O unit, the data indicating signal Pd is provided on the tag line $L_4$. Thus, the CPU 1 can input therein the data from the I/O unit.

Figure 8:
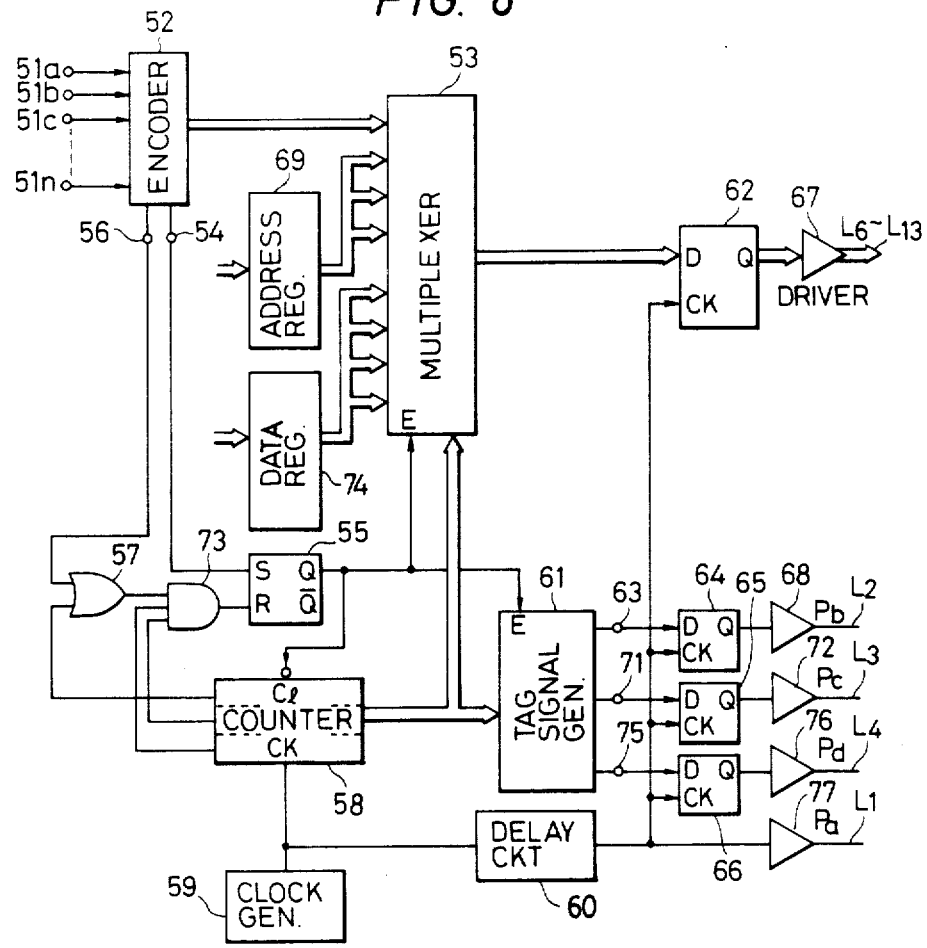
FIG. 8 is a diagram illustrating a specific example of means for sending out signals to buses in the CPU.

In order for the CPU 1 to generate such signals as depicted in FIG. 5, use is made of an arrangement such, for example, as shown in FIG. 8. From terminals $51a$, $51b$, $51c$ ... $51n$ are applied various control commands to an encoder 52, from which they are each provided as a parallel 8-bit control command to a multiplexer 53. When supplied with the control command, the encoder 52 derives an output at its output terminal 54, which is applied to a flip-flop 55 to set it. When the control command is a command for reading out data from a selected one of the I/O units, the encoder 52 provides an output at a terminal 56, and this output is applied to an OR gate 57. The output from the flip-flop 55 is applied to enable terminals E of both the multiplexer 53 and a tag signal generator 61 to make them operative; furthermore, the output from the flip-flop 55 is applied as a clear signal to a terminal Cl of a counter 58 to put it in operation for counting clock pulses from a clock generator 59. The counter 58 is a 3-stage counter and its content is applied as a control signal to the multiplexer 53 and, at the same time, it is also provided to the tag signal generator 61. when the control signal is "000", the multiplexer 53 selects and passes on the control command signal from the encoder 52 to a parallel 8-bit, D flip-flop 62, and the output at a terminal 63 of the tag signal generator 61 assumes H logic and is provided to a D flip-flop 64. The D flip-flops 62 and 64 are provided for timing use and the clock pulses from the clock generator 59 are properly delayed by a delay circuit 60, by the output of which input signals of each of the D flip-flops 62, 64, 65 and 66 are read out therefrom and outputted. The output from the flip-flop 62 at this time, that is, the control command signal, is applied via a driver 67 to the data lines $L_6$ to $L_{13}$. At the same time, the control command indicating signal Pb is provided from the flip-flop 64 to the tag line $L_2$ via a driver 68.

Thereafter, upon each occurrence of the clock pulse, 24-bit data of an address register 69 are applied to the parallel 8-bit, flip-flop 62 under the control of the multiplexer 53 and provided as the address signals $A_0$, $A_1$ and $A_2$ to the data lines $L_6$ to $L_{13}$. Simultaneously with this, the tag signal generator 61 derives a tag signal at its output terminal 71 in accordance with the count content of the counter 58 and the tag signal is timed by the D flip-flop 65 and then applied as the address indicating signal Pc to the tag line $L_3$ via a driver 72. In the case where the command from the CPU 1 is a command for reading out data from a selected one of the I/O units, the signal at the output terminal 56 of the encoder 52 is supplied via an OR circuit 57 to an AND circuit 73. At this time, outputs of two lower-order digits of the counter 58 both assume H logic and the AND circuit 73 derives therefrom an H output, which is supplied to the flip-flop 55 to reset it. Accordingly, when sending out of the tag signal Pc and the address signals $A_0$ to $A_2$ are completed in FIG. 5, the counter 58 is cleared and the multiplexer 53 and the tag signal generator 61 are stopped from operation.

In the case where the command from the CPU 1 is a write command, the data signals $D_0$ to $D_3$ are sent out after the sending out of the address signal, as described previously in connection with FIG. 5, but in this case, since the output at the terminal 56 does not assume the H logic state, the counter 58 is not cleared but with its stepping operation. In synchronysm with the clock pulses from the clock generator 59, 32-bit data of the data register 74 is applied via the multiplexer 53 to the parallel 8-bit D flip-flop 62 in bytes of eight parallel bits at a time. At the same time, the tag signal generator 61 produces a tag signal at its output terminal 75. This tag signal is timed by the D flip-flop 66, from which the data indicating signal Pd is provided via a driver 76 to the tag line $L_4$. The output from the delay circuit 60 is supplied via a driver 77 to the clock line $L_1$. Upon completion of sending out of the data $D_0$ to $D_3$, the output from the three counting stages of the counter 58 all assume H logic and the AND circuit 73 provide a coincidence output, by which the flip-flop 55 is reset, putting the entire circuit in its initial state as in the case of the data read-out operation.

Figure 9:
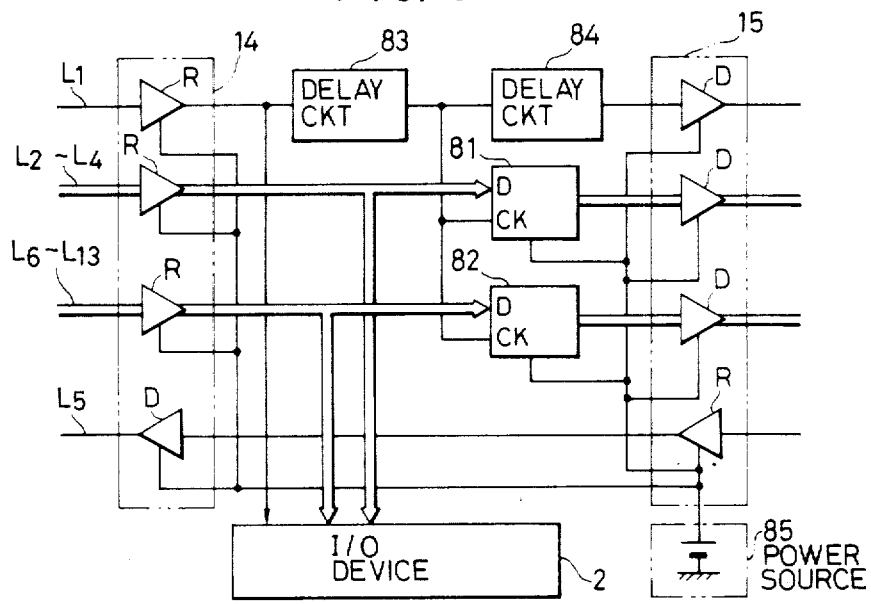
FIG. 9 is a diagram illustrating another example of the I/O interface.

It is preferred to perform re-timing of the data and the tag signal also in the I/O interface 4, as required. For example, as shown in FIG. 9, the tag signal from the tag lines $L_2$ to $L_4$ is applied via the receiver R to a re-timing circuit, for example, a data terminal D of a D flip-flop 81 and, similarly, the signals from the data lines $L_6$ to $L_{13}$ are provided to a data terminal D of a D flip-flop 82. The clock signal of the clock line $L_1$ is delayed by a delay circuit 83 corresponding to the delays of the abovesaid signals and the delayed clock signal is applied to clock terminals of the D flip-flops 81 and 82, by which signals at their data terminals are read therein and their outputs are respectively supplied to drivers D corresponding thereto, thereafter being sent to the next I/O unit. The clock signal of the delay circuit 83 is applied to a driver D via a delay circuit 84 having a delay corresponding to the delays of the flip-flops 81 and 82 and is sent to the next I/O unit. In this figure, the signal sent out from the I/O device 2 is not shown.

In the above embodiment, after the control command signal CB is sent out to the data lines $L_6$ to $L_{13}$, the address signals $A_0$ to $A_2$ are sent out, but the control command signal may also be sent out after sending out the address signals. Also, the decision as to whether to write data in the data registers $20a$ to $20d$ of the I/O unit and utilize the data may be made depending on whether or not the address decoded output, that is, the output Pe is derived at the terminal 35. Further, the I/O control system of the above embodiment, the I/O units are cascade-connected, so that if a power failure occurs in one of the I/O units, data transfer becomes impossible over the entire system. Accordingly, it is preferred that the I/O interface retains the relay function by a separate power source in such a power source trouble. For example, as shown in FIG. 9, a power source 85 is provided separately of that for the I/O device 2 so that operating power is applied to each receiver of the input port 14, each driver of the output port 15 and the flip-flops 81 and 82, thus preventing the I/O interface from being affected by the trouble of the power source for the I/O unit. Further, in the above embodiment, the tag signals are each transmitted over one of the tag lines $L_2$ to $L_4$, but they may also be transmitted, using two tag lines; namely, it is possible to represent the signals Pb, Pc and Pd by applying a signal to one of the two tag lines, a signal to the other and two signals to both of them, respectively. Moreover, it is also possible to add to the data lines $L_6$ to $L_{13}$ a parity line for a parity bit for the signal of eight bits simultaneously transmitted over the data lines $L_6$ to $L_{13}$.

As described in the foregoing, according to the present invention, the number of conductors of the bus used can be reduced since the control command signal CB, the address signal $A_D$ and the data signal $D_S$ are transmitted over the data lines $L_6$ to $L_{13}$ on the time shared basis. Assuming, for example, that the data signal has 32 bits, that the address signal has 24 bits and that the control command includes six kinds of commands for write, read, interrupt request acknowledgment, interruption inhibit, resetting and triggering, the prior art system shown in FIGS. 1 and 2 requires a total of 64 core conductors; namely, 32 for the data signal, 24 for the address signal, six for the control command signal, one for interrupt request and one for response. According to the above-described embodiment of the present invention, however, the number of core required conductors of in the bus may be 14; namely, eight data lines, three tag lines, one response line, one clock line (for instance, having the configuration of the data enable tag line L4 of FIG. 4) and one interrupt request line. Further, since the data signal and the address signal are also sent out on the time shared basis, the address signal $A_D$ and the data signal $D_S$, each having a larger number of bits than the number of the data lines $L_6$ to $L_{13}$, can be transferred. Therefore, in order to increase the numbers of bits of the address signal and the data signal for enhancement of the function of the system used, it is sufficient only to convert the increased bits into parallel signals and apply them on the time shared basis. Accordingly, even if the numbers of bits of the address signal $A_D$ and the data signal $D_S$ are increased, the number of core conductors of the bus need not be changed and the numbers of drivers and receivers need not be increased either. It is sufficient only to change the capacity of the address registers $18a$ to $18c$ and the data registers $20a$ to $20c$. Consequently, the function of the system can easily be modified. Moreover, according to the present invention, in each of the I/O units $2a$ of $2f$, the clock signal Pa, the control command indicating signal Pb, the address indicating signal Pc, the data indicating signal Pd, the control command signal CB, the address signal $A_D$ and the data signal $D_S$ are all transmitted in one direction and transmitted via the drivers D to the next-stage I/O unit. Accordingly, the drivers D in the output port 15 of each I/O unit and the drivers in the port of the CPU 1 are required only to apply signals to one I/O unit. Consequently, the influence of a reflected wave on the waveform transmitted is produced by a reflected wave from only one I/O unit, so that the influence of the reflected wave can be reduced, and hence the waveform is less disturbed. In addition, the signal transmission rate can be determined, taking into account the delay time in each I/O unit. Namely, according to the present invention, since each signal is surely relayed by the I/O units $2a$ to $2f$, the transmission of the next signal need not be deferred until the signal from the CPU 1 reaches the I/O unit located at a place remotest from the CPU 1. Accordingly, the next signal can be sent out behind the previous signal only by the delay time in one I/O unit, so that the signal sending-out rate can be increased and high-speed signal transfer can be achieved.

In addition, the response signal Pe is outputted from the I/O unit assigned by the control command signal CB and the address signal $A_D$ and the response line $L_5$ is reverse in direction from the other signal lines, so that a failure diagnosis of the I/O unit can easily be effected. For example, when data read out from a certain I/O unit by a command from the CPU 1 does not reach the CPU 1, a failure diagnosis is carried out. Since the response line $L_5$ for the response signal Pe is reverse in direction from the other signal lines as in the foregoing embodiment, it can be learned that in the case of the I/O unit, for example, $2a$ having been assigned, when the response signal Pe is obtained therefrom the transmission line between the CPU 1 and the I/O unit $2a$ is normal. In this case, if the response signal Pe is not obtained, it can be known that the I/O unit $2a$ is out of order. When the I/O unit $2b$ is assigned, the arrival of the response signal Pe to the CPU 1 indicates that the system up to the I/O unit 2b is normal. In this way, the I/O units can be diagnosed in a sequential order. In the case where the line of the response signal Pe is assumed to be the same in direction as the other signal lines, when a certain one of the I/O units breaks down, no response signal Pe is provided to the CPU 1 even if any I/O units are assigned; namely, it is impossible to locate the malfunctioning I/O unit.

Thus, by making the response signal line opposite in direction to the other signal lines as in the foregoing embodiment, it is possible to locate a malfunctioning I/O unit, whichever unit may get out of order.

It will be apparent that many modifications and variations may be effected without departing from the scope of the novel concepts of this invention.

What is claimed is:

1. An I/O control system comprising:
   a central processing unit with input and output ports for respectively transmitting and receiving control commands and data;
   a plurality of I/O units, each for performing data transmission and reception between it and the central processing unit in accordance with said control commands from the central processing unit, and each having an input port and an output port; and
   a transmission bus for cascade connecting said input and output ports of said I/O units with each other and with said input and output ports of the central processing unit, the bus comprising a plurality of one-way data lines for transmitting on a time shared basis a control command signal for providing each said control command, an address signal for selecting each respective I/O unit and respective data signal, a plurality of tag lines for transmitting a respective tag signals indicating which of said control command, address and data signals is being sent out on the data lines, and a clock line for transmitting a reference clock signal in correspondence with said control command, address, data and tag signals;
   wherein said one-way transmission bus includes a respective segment connecting internally between the input and output ports of each said I/O unit, each said input port of each said I/O unit includes a respective receiver for each of said data, tag and clock lines, each said output port of each said I/O unit includes a respective driver for each of said data, tag and clock lines, and the output of each said receiver is connected to the input of the respective driver for each of said data, tag and clock lines of each respective I/O unit.

2. The system of 1, wherein the central processing unit is provided with means for sending out the control command signal, the address signal and the data signal on the data lines in synchronism with the clock signal on the time shared basis, and means for sending out on the tag lines the tag signal indicating the kind of signal sent out on the data lines.

3. The system of claim 1 or 2, wherein each said I/O unit includes a means for providing to said segment of each said data line a data signal read out from the respective I/O unit in response to a read-out command from said central processing unit, and for providing to the segment of each corresponding tag line a data indicating signal indicating the sending out of the data signal by the I/O unit.

4. The system of claim 1 or 2, wherein each said I/O unit includes a control command register which is controlled by a respective control command indicating signal on each respective one of said tag lines and the clock signal on the clock lines from the respective input port, to latch the respective control command signal on each respective data line from the input port, a control command decoder for decoding the content of the control command register, an address register for controlling the address signal of the data lines from the input port by the address indicating signal of the tag lines and the clock signal of the clock line to latch the address signal, an address decoder for detecting whether the content of the address register corresponds to the address of the respective I/O unit, and a data register controlled by the output from the address decoder, a write command output from the control command decoder, the data indicating signal of the tag lines and the clock signal to latch the data signal of the data lines.

5. The I/O system of claim 4, each said I/O unit including means for outputting said data signal from the I/O unit via the output port in correspondence with said detected output from the respective address decoder, said data read-out output from the control command decoder and the clock signal, and means for sending out a corresponding data sending out indicating signal via the output port to a respective tag line during the sending out of the data.

6. The I/O system of claim 1 or 2, each said I/O unit including means for detecting the respective address signal for the I/O unit and generating a respective response signal, and said bus including a response signal line for transmitting the response signal from each I/O unit to said central processing unit by a respective cascade connection.

7. The system of claim 6, wherein the direction of signal transmission of the response signal line is opposite to said common direction of transmission on the data, tag and clock lines.

8. The system of claim 1 or 2, wherein a respective one of said tag lines is provided in correspondence to each of said indicating signals.

9. The I/O system of claim 1 or 2, wherein the number of said tag lines is smaller than the number of kinds of said control command, address and data signals transmitted over said data lines, and wherein said command control, address and data signals on said data lines are identified as such by respective combinations of signals on the plurality of tag lines.

10. The I/O system of claim 1 or 2, wherein each said I/O unit is provided with re-timing means for synchronously timing the signals output from the drivers of the I/O unit.

11. The system of claim 7, said response signal line including a receiver and a driver in each said I/O unit, wherein a signal corresponding to the output of the receiver is input into the driver.

12. The system of claim 11, wherein each said I/O unit is provided with re-timing means for synchronously timing the signals output from the drivers of the I/O unit.

13. The system of claim 1 or 2, said drivers and receivers of each said I/O unit being powered independently from the supply of power to other components of the I/O unit.

14. The system of claim 3, wherein each said I/O unit is provided with re-timing means for synchronously timing the signals output from the drivers of the I/O unit.

15. The system o claim 1 or 2 wherein each said I/O uit includes an interface unit which comprises each said internal segment of said one-way transmission bus, driver and receiver of the I/O unit.

* * * * *

UNITED STATES PATENT AND TRADEMARK OFFICE
CERTIFICATE OF CORRECTION

PATENT NO. : 4,573,120
DATED : March 4, 1986
INVENTOR(S) : EIICHI YADA

It is certified that error appears in the above-identified patent and that said Letters Patent is hereby corrected as shown below:

Column 3, line 9, "Besies" should be --Besides--.

Column 5, line 38, "$L_5$" should be --$L_4$--.

Column 8, line 17, "when" should be --When--.

Column 10, line 5 "core required" should be --required core--;
        line 6, delete "of:
        line 9 "L4" should be --$L_4$--.

Column 11, line 34, delete "a".

Column 12, line 64, "o" should be --of--;
        line 65 "uit" should be --unit--.

Signed and Sealed this

Twenty-fourth Day of June 1986

[SEAL]

Attest:

DONALD J. QUIGG

Attesting Officer     Commissioner of Patents and Trademarks

UNITED STATES PATENT AND TRADEMARK OFFICE
CERTIFICATE OF CORRECTION

PATENT NO. : 4,573,120

DATED : 25 February 1986

INVENTOR(S) : YOSHICHIKA ICHIMIYA et al

It is certified that error appears in the above-identified patent and that said Letters Patent is hereby corrected as shown below:

Col. 3, line 9, "Besies" should be --Besides--;

Col. 5, line 38, "$L_5$" should be --$L_4$--.

Col. 8, line 17, "when" should be --When--.

Col. 10, line 5, "core required" should be --required core--;
line 6, delete "of";
line 9, "L4" should be --$L_4$--.

Col. 11, line 34, delete "a".

Col. 12, line 64, "o" should be --of--;
line 65, "uit" should be --unit--.

This certificate supersedes Certificate of Correction issued June 24, 1986.

Signed and Sealed this

Twenty-eighth Day of October, 1986

[SEAL]

Attest:

DONALD J. QUIGG

Attesting Officer       Commissioner of Patents and Trademarks